UNITED STATES PATENT OFFICE.

AUGUST J. METZLER, OF BROOKLYN, ASSIGNOR TO C. C. PUFFER, OF ROCHESTER, NEW YORK.

PROCESS OF MANUFACTURING BEER.

SPECIFICATION forming part of Letters Patent No. 436,534, dated September 16, 1890.

Application filed December 31, 1888. Serial No. 295,074. (No specimens.)

*To all whom it may concern:*

Be it known that I, AUGUST J. METZLER, a citizen of the United States, residing at Brooklyn, county of Kings, State of New York, have invented a certain new and useful Improvement in the Process of Manufacturing Beer; and I declare the following to be a full, clear, and exact description of the invention, such as will enable others skilled in the art to which it pertains to make and use the same.

Heretofore two general processes have been employed for making beer. The first process ran the beer from the fermenting-tubs into ruh-casks, where it rested for many weeks or even months to acquire the properties of age and ripeness. When ripe, it was flat. It was then bunged up and the slow incipient fermentation after some weeks or months would develop enough carbonic-acid gas to enliven it sufficiently for the market. This required great storage capacity, and the beer during its long rest in the open or unbunged ruh-casks was apt to acquire from contiguous contaminating sources or from chemical changes of foreign substances in the beer itself putrid flavors or odors. The enlivening stage to prepare it for the market was then greatly reduced by a process in vogue for some years past, as follows: The ripened ruh-beer was drawn into shavings-casks, and here was added ten per cent., more or less, of young beer, or "kraeusen," as it is termed, fresh from the fermenting-tubs. This excited wild fermentation. Before this fermentation ensued, or after it had partially subsided, finings were added and the cask was bunged up. Pressure was quickly generated, and by vent-bungs or otherwise was maintained at seven pounds, more or less. This assisted to clarify the beer, and as soon as clear it was ready for the market. The new beer, or kraeusen, however, detracted from the "age" or "ripeness" of the beer, so that although there was great saving in time of production there was a corresponding depreciation of the product. So, also, the ruh stage has been greatly shortened by maintaining the beer in this stage under a partial vacuum, by which the characteristics of age or ripeness have been acquired in a few days, whereas before it took many weeks or months. It was then prepared for market by the use of kraeusen in shavings-casks in the way above explained.

My present invention may be properly regarded as an improvement in the last-named process, and may be described as follows: I bring the beer to its ripened ruh state by the vacuum process, as above, maintaining preferably a cold cellar at, say, 32° or 34° Fahrenheit, and a mercury-vacuum of, say, eighteen inches, more or less. Then while thus under the vacuum I add to the beer in the ruh-casks, or in other casks, as may be deemed advisable, a small percentage of saccharine matter—say five per cent. to ten per cent. of the mass of ruh-beer—and without otherwise relieving the vacuum cease to longer produce the same, but permit the vacuum to be relieved by the carbonic-acid gas generated by the fermentation of the saccharine. When this fermentation begins, it finds the beer, as it were, in the condition of a squeezed sponge, the air and the oxygen having been drawn off by the vacuum and ready to reabsorb with avidity the carbonic-acid gas as it is developed. When the vacuum is thus relieved, the gas is permitted to accumulate until a pressure of seven pounds, more or less, is attained, sufficient to give to the beer the desired life for the market. Finings may be added at any suitable stage, should the beer not clarify under pressure without them, and when clear the beer is ready for the market. This process dispenses entirely with the use of kraeusen or young beer, so that the ruh-beer is not impaired in its qualities of age or ripeness. Moreover, the transition from the condition of partial vacuum to that of pressure by the action of the saccharine produces a valuable result. Ordinarily such fermentation would cause an agitation and seething of the mass, due to the rising through it of the bubbles of carbonic acid generated by fermentation, and this would of course stir up the sediments and also develop flocculent matter, which would render the beer exceedingly turbid; but by the process herein described the gas as fast as generated is at once absorbed by the liquid immediately adjacent thereto, due to its condition of partial vacuum, and until a quantity has been developed sufficient to supply the vacuity little or none rises through the liquid. Should the violence of the fermentation thereafter render the beer materially turbid, so that accumulated pressure will not precipitate and clarify it, finings may be employed, as explained.

If desired, a pressure of carbonic acid may be added to the beer from an external source as soon as the vacuum has been relieved and be carried up to the said seven pounds, more or less, and so operate with suitable vent-bungs or bunging apparatus to maintain the said pressure while holding back the violence of the fermentation to an extent to enable it to have its run and to subside without so clouding the beer as to require the use of finings.

To introduce the saccharine matter, it may be done in any convenient way. Thus a solution of it might be put into a closed receptacle connected with the cask by a pipe having a valve. Then by opening the valve the contents would pass into the cask.

It is not here desired to lay claim, broadly, to the feature of relieving the vacuum by carbonic-acid gas, for an application filed by me, Serial No. 295,077, describes and claims such use of gas introduced above the ripened ruh-beer to prepare it for the market, and an application, Serial No. 295,075, describes its use in the manufacture of ruh-beer; and in another application, Serial No. 295,076, I describe and claim the use of saccharine or saccharine and yeast in the beer in combination with gas introduced from the exterior to relieve the vacuum; but

What I claim is—

1. The process of making beer, which consists in maintaining the beer under a partial vacuum during the ruh stage until it has been ripened, then adding thereto a small proportion of saccharine matter, and permitting the carbonic-acid gas thus developed to relieve the vacuum in the cask and beer, substantially as described.

2. The process of making beer, which consists in maintaining the beer under a partial vacuum during the ruh stage until it has ripened, then adding thereto a small percentage of saccharine matter and permitting the carbonic-acid gas thus developed to relieve the vacuity in the cask and beer, and then subjecting the beer to a pressure of carbonic-acid gas sufficient to give it the desired life for the market, substantially as described.

3. The process of making beer, which consists in maintaining the beer under a partial vacuum during the ruh stage until it has ripened, then adding a small proportion of saccharine matter and permitting the carbonic-acid gas thus developed to relieve the vacuum in the beer and cask, and permitting the surplus to accumulate and generate the pressure necessary to give to the beer the desired life for the market, substantially as described.

In testimony whereof I sign this specification in the presence of two witnesses.

AUGUST J. METZLER.

Witnesses:
WASH. L. JAQUES,
C. C. PUFFER.